United States Patent [19]

Borzym

[11] 4,055,096
[45] Oct. 25, 1977

[54] DIE SET FOR CUTTING I-BEAM
[75] Inventor: Alexander Borzym, Dearborn, Mich.
[73] Assignee: Alpha Industries, Inc., Detroit, Mich.
[21] Appl. No.: 693,170
[22] Filed: June 7, 1976
[51] Int. Cl.$^2$ .......................... B23D 25/02; B26D 1/56
[52] U.S. Cl. .......................................... 83/37; 83/310; 83/320; 83/694
[58] Field of Search ................. 83/310, 320, 328, 694, 83/37, 318, 319

[56] References Cited
U.S. PATENT DOCUMENTS

| | | | |
|---|---|---|---|
| 515,746 | 3/1894 | Cameron et al. | 83/694 |
| 858,703 | 7/1907 | Castle | 83/694 |
| 2,366,987 | 1/1945 | Soutar | 83/694 X |
| 2,884,063 | 4/1959 | Stover | 83/694 X |

Primary Examiner—Willie G. Abercrombie
Attorney, Agent, or Firm—Krass & Young

[57] ABSTRACT

An I-beam section traveling from the apparatus in which it is fabricated is cut on the fly by a die set or shear which is moved with the I-beam. The cut is effected by a stepped blade having a leading cutting edge and a trailing cutting edge, the latter being in the same plane but laterally offset from the former. The cut proceeds at a 45° angle to the plane of the web and flanges. The leading edge enters the I-beam at the middle of the web and cuts the remainder of the web and the lower flange. The trailing blade edge engages the margin of the upper flange and cuts through this flange and the remainder of the web. The cutting blade is mounted on a reciprocable upper shoe and the I-beam is fed through structure mounted on the lower shoe which has an opening for the I-beam to pass with considerable clearance. Inserts mounted on the lower shoe underlie the web and flanges of the I-beam to support the beam during the cut. Known apparatus may be used to accelerate the die set into synchronizm with the moving workpiece and to reciprocate the upper member for the cutting stroke.

9 Claims, 5 Drawing Figures

DIE SET FOR CUTTING I-BEAM

INTRODUCTION

This invention relates to cutoff apparatus for shaped workpieces such as I-beams, and particularly to a shear type cutoff apparatus which operates with such speed as to make feasible a flying cut on a beam emerging from a high speed mill.

BACKGROUND OF THE INVENTION

I-beams and structural members of similar shapes may be fabricated in a continuous fashion by extrusion or by welding. In either case, it is necessary to sever the product into manageable lengths, preferably without stopping the fabrication process.

Factors such as shape, toughness and the desire for cleanly cut beam ends have heretofore indicated the use of a saw to perform the cutoff operation. However, a saw is relatively slow and, hence, must move with the beam for a great distance if a flying cut is to be made. This, of course, requires a long carriage for the saw and usually forces a recut operation to reduce the beam sections to shorter lengths. Saws are also environmental polluters, creating both noise and particles of the cut workpiece in the area of operation.

Shear type cutoffs, on the other hand, are fast, clean and relatively more quiet, and are commonly used to cut tubes and sheet metal. Therefore, it would be highly advantageous to provide means for applying the shear type cutoff apparatus to the relatively difficult task of severing structural beams.

BRIEF SUMMARY OF THE INVENTION

In general, these and other objects are accomplished by means of an apparatus by which a shearing knife or blade of stepped cutting edge is caused to pass through a guide structure which supports the beam during the cut, the travel of the blade being at an angle relative to the web and flange of the beam such that cutting is simultaneously begun at two or more spaced points in the plane of the cut.

While the invention is described hereinafter in terms of the severing of I-beams it will be apparent that the principles of the invention may be applicable to cutting other sections; for example, channel sections and Z sections.

The principal object of my invention is to cut off structural members such as I-beams rapidly, economically, and with a minimum of distortion at the cut ends. A further object is to provide a process and apparatus for cutting which is tolerant of variations in dimensions of the workpiece. A still further object is to provide a process and apparatus which provides for cutting off an I-beam or the like with a relatively short cutting stroke.

The nature of my invention and its advantages will be clear to those skilled in the art from the succeeding detailed description of the preferred embodiment of the method and of the preferred machine for effecting the cutoff operation.

DETAILED DESCRIPTION OF THE SPECIFIC EMBODIMENT

Figure 1:
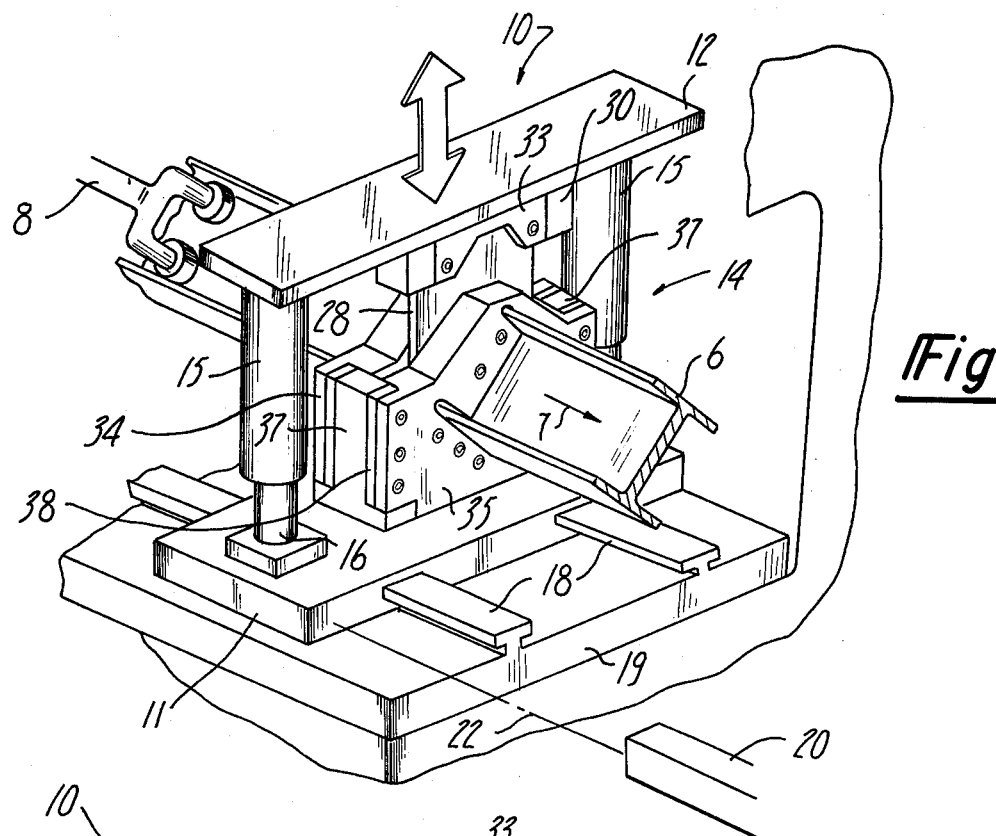
FIG. 1 is a partially schematic isometric view of an apparatus for cutting I-beam sections into predetermined lengths.

FIG. 1 illustrates a wide flange I-beam 6 emerging at high speed from a continuous welding mill which joins three strips of flat steel stock into the web and upper and lower flanges of the beam. The beam 6 is guided in its travel from the fabricating mill to the severing apparatus of my invention by suitable guide means such as the guide roller set 8, another such roller set being disposed on the underside of the beam 6 as seen in FIG. 1.

The apparatus in which my invention is embodied includes a so-called die set 10 having a lower shoe 11 and an upper shoe 12. The upper shoe is guided for reciprocation relative to the lower shoe by guide means 14 specifically comprising two bushings 15 fixed to the upper shoe and two guide pins 16 reciprocable within the bushings 15 and affixed to the lower shoe 11.

The die set 10 is guided for back-and-forth movement along the travel axis of the workpiece 6 on ways or rails 18 on a suitable machine base 19. Although shown integral with the base 19, the rails 18 may be made removable for replacement purposes. The lower carriage 11 is suitably connected to a bi-directional accelerator 20 which causes it to achieve synchronous speed with the workpiece and then, after the cutoff operation, decelerates the movement of the die set and returns it to its initial position in readiness for a subsequent cutoff operation. Such accelerators are well known and need not be shown or described in detail here. As indicated schematically, the accelerator 20 is connected to the lower shoe 11 by suitable linkage 22. The upper shoe 12 is reciprocated downwardly to cut off the workpiece and raised to its initial position by a suitable press which may be conventional. It will be understood that means must be provided between the shoe 12 and the press ram to accommodate the travel of the die set 10 during flying cutoff operations. The press ram or other means for moving the upper carriage through the cutting stroke is known and therefore is not illustrated in detail. A suitable press is available from Alpha Industries of Detroit, Mich. and is sold under the trade name "Swinging Ram". Association of a cutoff die with a suitable press is illustrated in Borzym U.S. Pat. Nos. 3,288,011 and 3,288,012, Nov. 29, 1966.

Figure 2:
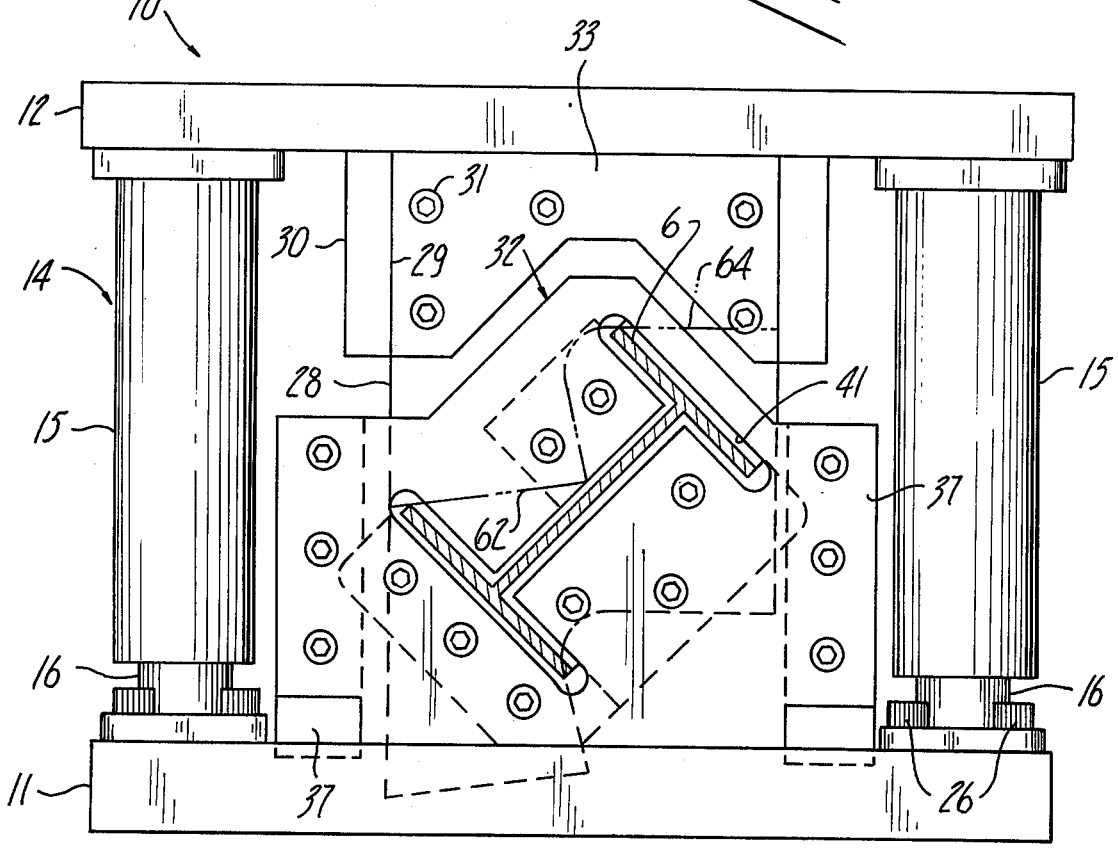
FIG. 2 is an elevation view of the cutting die set, the I-beam being shown in transverse section.

Referring now to FIG. 2, the die set 10 is illustrated looking in the direction of the axis of the I-beam 6. Again, the carriages that connect the lower shoe 11 to the ways 18 and the upper shoe 12 to the press are not illustrated. These may bolt to the shoes 11 and 12 as shown in FIG. 2. As illustrated, the guide pins 16 are flanged and are fixed to the shoe 11 by capscrews 26. A flange on the upper end of each bushing 16 is fixed to the upper shoe 12 by capscrews passing through the upper shoe, for instance (not illustrated). The guide means 14 thus guide the upper shoe for reciprocation relative to the lower shoe.

This brings us to the parts of the apparatus which perform the actual severing, shearing or cutoff operation. A cutting blade 28 is rigidly mounted in a pocket 29 in the face of a blade holder 30 and covered with a clamp member 33. Blade holder 30 is secured to upper shoe 12 by screws visible on the top of shoe 12 in FIG. 1. Blade 28 is held in place by machine screws 31 passing through the clamp member 33. The blade thus reciprocates vertically with the shoe 12 under the action of the press ram.

Figure 3:
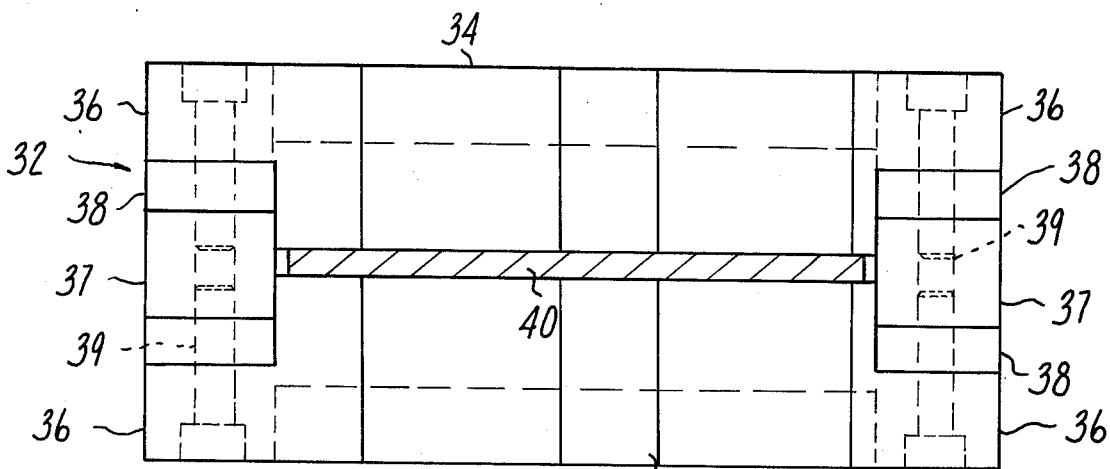
FIG. 3 is a plan view of the lower die set.
Figure 4:
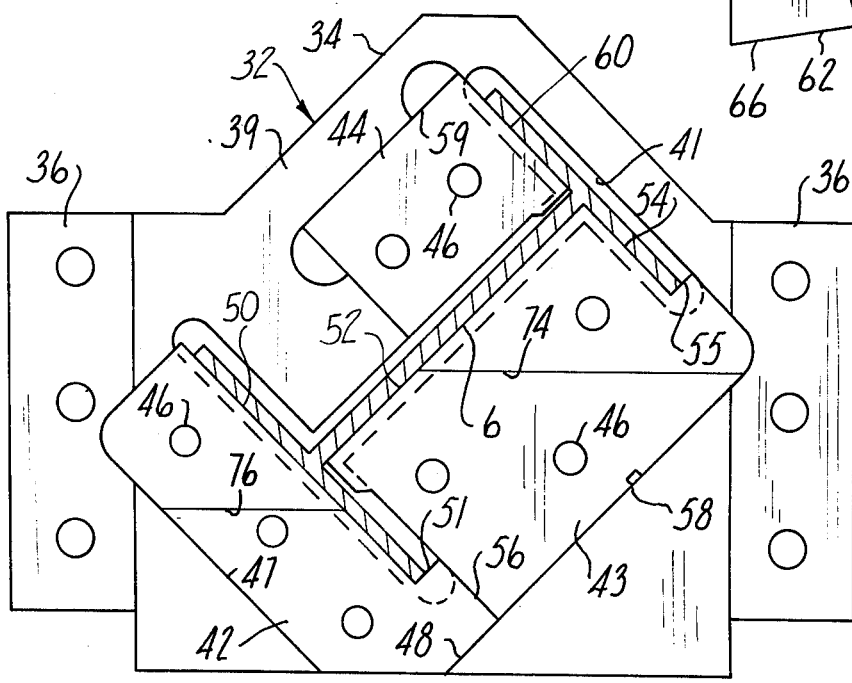
FIG. 4 is an elevation view of the lower die set particularly illustrating the workpiece supporting inserts.

Blade 28 and the blade holder 30 move reciprocably through the lower assembly 32 of insert holders and inserts mounted on the lower shoe 11. This assembly is shown more clearly in FIGS. 3 and 4. Assembly 32 comprises opposed front and rear insert holders 34 and 35. These holders are basically mirror images of each other taken along the plane of the blade slot 40. Each holder has lateral flanges 36 that are fixed to right and left upright posts 37 which are bolted to the lower shoe 11. Machine screws 39 fixing them together pass through spacer blocks 38 which determine the width of the slot 40 for passage of the blade 28 between the adjacent faces of the insert holders. An opening 41 for passage of the I-beam 6 is machined or cut in each of the holders 34 and 35. It should be noted that there is considerable clearance to allow free passage of the I-beam section and to allow for some variations or tolerance in the dimensions of the I-beam in production. When in place, the openings 41 in the holders register with one another to permit the I-beam to pass therethrough.

Two sets of three replaceable, hardened steel inserts underlie the lower surface of the flanges and the web of the I-beam for support during the cut. Such inserts are mounted on the inside opposing faces of both of the holders 34 and 35. As shown most clearly in FIG. 4, the inserts in the holder 34 are a first insert 42, a second insert 43, and a third insert 44. The recesses in which these are mounted are milled in the surface of the holder adjacent the companion plate 34 or 35. The inserts are held in place in the recesses by machine screws 46 and their location may be adjusted by a shim which may be placed between the edge of the insert and the edge of the recess in the holder 34 or 35. The insert 42 which underlies the lower flange of the I-beam bears against the margins of the recess along the surfaces 47 and 48. The shims may be placed along the surfaces 47 and 48 for final location of the first insert 42. It will be noted that this insert has a principal cutting edge at 50 underlying the lower flange of the I-beam and a narrow edge at 51 abutting the edge of the I-beam flange. The second insert 43 has a cutting edge 52 underlying the web of the I-beam and cutting edges 54 and 55 underlying half of the upper flange of the I-beam. This insert abuts the first insert along the plane 56 and abuts the wall of the recess in the plate 34 at 58. The third insert 44 is disposed in the machined recess 59 with a cutting edge 60 underlying the remainder of the upper flange of the I-beam.

When the inserts are put in place and the two plates 34 and 35 are bolted to the posts 37, the stationary member of the shear or cutoff apparatus is completed and the movable cutting blade 28 may move downwardly between the faces of the two assemblies 32 through the slot or guideway 40 to cut out a narrow section of the length of the I-beam and sever it completely.

Figure 5:
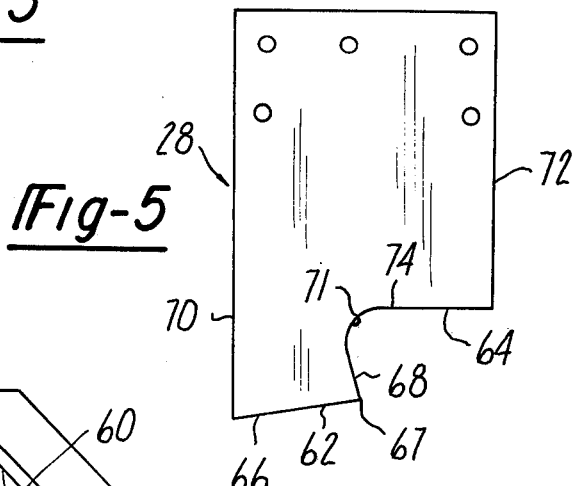
FIG. 5 is an elevation view of the movable cutting blade.

As is apparent from FIG. 2 and also from FIG. 5, the blade 28 is of a special configuration to accomplish the cutting with a minimum length of stroke and in minimum time. The blade 28 has a stepped cutting edge with a leading cutting edge portion 62 and an offset trailing cutting edge portion 64. Cutting edge portion 62 may be slightly inclined and in any event should be configured so that the edge engages the flange of the I-beam approximately at the point 66 indicated in FIG. 2 when a corner 67 engages the web of the I-beam approximately at its middle. The step in the edge of the blade is defined by an edge 68 which converges somewhat toward the side 70 of the blade to provide a slight clearance. This step in the blade is joined by a curved edge portion 71 to the second or trailing edge portion 64 which extends to the other side 72 of the blade. The cutting edge 64 may be substantially perpendicular to the direction of movement of the blade. This cutting edge engages the upper flange of the blade of the I-beam approximately at the point 74 indicated in FIG. 2. It will be seen, therefore, in operation of the apparatus, the leading blade portion 62 is simultaneously cutting through the upper half of the lower flange and the lower half of the web and thereafter completing the cut through the lower flange. The trailing blade portion 64 begins the cut through the upper flange at the same time that the cut is initiated through the web and lower flange, first cutting through the upper half of the upper flange as disposed and then simultaneously cutting through the remainder of the upper flange and the upper half of the web of the I-beam. This has been found to give accurate cutting with a minimum of distortion of the cut section, and, as will be apparent, the stepped configuration of the blade and the oblique disposition of the I-beam relative to the direction of travel of the blade make it possible to accomplish the cutting with a very short cutting stroke which minimizes the time required for the cutting operation.

The inserts 42, 43, and 44 (FIG. 4) have some clearance from the faces of the blade 28. This will vary with the thickness of the stock being cut, and can be varied by controlling the thickness of spacers 38. With the workpiece described, a clearance of about 0.4 millimeter might be used for insert 44, for the portion of insert 43 to the right of line 74, and for insert 42 to the left of line 76. The remainder of inserts 42 and 43 have a double thickness of material pushed past them by the blade, and should have about 0.8 millimeter clearance.

It will be apparent that the cutting blade may travel in any direction so long as the I-beam or other section is properly oriented with respect to it. Accordingly, the die set 10 may be used in an inclined-ram press as well as a vertical ram press.

The merits of the invention in providing a cutoff method and apparatus particularly effective to achieve the objects stated above will be clear from the foregoing description.

It is to be understood that various changes and modifications to the invention as illustrated and described are possible and further that the foregoing description is illustrative in nature and is not to be construed in a limiting sense. In particular, it is to be understood that the invention is not limited to flying cut applications but may also be used to advantage in making stationary cuts.

The embodiments of the invention in which an exclusive property or privilege is claimed are defined as follows:

1. A method of cutting off an I-beam comprising simultaneously cutting through the beam with a stepped cutting blade having two blade cutting edges, one edge trailing the other edge, said blade moved at an acute angle to the planes of the web and flanges and substantially perpendicularly to the longitudinal axis of the beam in which said leading blade edge cuts through one flange and approximately half of the web of the beam and said trailing blade edge cuts through the other flange and the remainder of the web of the beam.

2. A method as set forth in claim 1 wherein the angle is about 45°.

3. A method of severing an I-beam comprising impinging the beam between first and second dies, the first die having supporting edges located to engage one side of the I-beam web and the underfaces of the I-beam flanges, and the second die movable with respect to said first die and having leading and trailing cutting portions offset from each other along the direction of movement so as to comprise leading and trailing edges engaging the other side of the web and the upper faces of the flanges and in which movement the second die is reciprocated across the I-beam at an acute angle to the plane of the I-beam web and the second die is configured to engage the I-beam substantially simultaneously at three points, the points being the edge of each flange first encountered by the second die and the web at a location approximately midway between the flanges.

4. A method as set forth in claim 3 wherein the angle is about 45°.

5. A die set for use in combination with a press or the like for severing structural sections of predetermined configuration having a web and having a flange extending transversely to the web fixed on each edge of the web, the die set comprising a frame defining a guide slot directed transversely of the section and at an acute angle to the plane of the web; a movable cutting blade reciprocable in the slot through a cutting stroke having a cutting edge movable across the section to sever the section; and fixed blade support means underlying the web and flanges in position to support the section against the thrust of the movable blade; the said cutting edge having two cutting portions offset from each other in the direction of movement of the blade each adapted to sever respective parts of the section, the cutting portions each extending approximately at a right angle to the direction of movement of the blade, and one portion being in advance of the other portion so that the said one portion engages the web and one flange of the section substantially at the same time the other portion engages the other flange during the cutting stroke.

6. A cutting blade adapted for cutting off wide flange I-beams during a cutting stroke directed substantially at a right angle to the axis of the I-beam and at an acute angle to the plane of the web of the I-beam, the blade having a stepped cutting edge with a leading cutting edge portion adapted to engage the I-beam substantially simultaneously at the edge of one flange and adjacent to the center of the web, and with a trailing cutting edge portion offset from the leading cutting edge along the direction of the stroke and adapted to engage of the other flange substantially simultaneously with the engagement of the leading portion with the I-beam.

7. A cutting blade adapted for cutting off wide flange I-beams during a cutting stroke directed substantially at a right angle to the axis of the I-beam and at an acute angle to the plane of the web of the I-beam, the blade having a stepped cutting edge with a leading cutting edge portion adapted to engage the I-beam substantially simultaneously at the edge of one flange and adjacent to the center of the web, and with a trailing cutting edge portion offset from the leading cutting edge along the direction of the cutting stroke and adapted to engage the edge of the other flange substantially simultaneously with the engagement of the leading portion with the I-beam, the cutting edge portions each extending approximately perpendicularly to the direction of the cutting stroke and being connected by an edge extending generally in the direction of the stroke but having clearance from the cut made by the leading cutting edge portion.

8. The die set according to claim 5 wherein said fixed blade support means apparatus for severing structural beams comprises an insert holder adapted to be mounted on said frame and having a shaped aperture formed therein through which the beam may be caused to pass with considerable clearance, a set of inserts mounted on the holder to underlie parts of the beam when in the aperture, said inserts being positioned to take up some of said clearance, said blade movable through the beam in close proximity to said inserts.

9. The die set as set forth in claim 8 said fixed blade support means further including a second insert holder disposed in spaced parallel relation to the said insert holder and having an aperture for the beam in registry with that of said insert holder, a second set of inserts carried by said second holder in reversely registering relation with the inserts of said insert holder and spaced therefrom to define a blade slot, said blade movable through said slot to penetrate and sever said beam.

* * * * *